US012688192B2

(12) United States Patent
Zhu et al.

(10) Patent No.: US 12,688,192 B2
(45) Date of Patent: Jul. 21, 2026

(54) METHOD FOR PROCESSING ORACLE REGION CACHE ELECTRONIC DEVICE, AND STORAGE MEDIUM

(71) Applicant: Beijing Baidu Netcom Science Technology Co., Ltd., Beijing (CN)

(72) Inventors: Chenchang Zhu, Beijing (CN); Jialin Feng, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 18/747,101

(22) Filed: Jun. 18, 2024

(65) Prior Publication Data

US 2025/0124029 A1 Apr. 17, 2025

(30) Foreign Application Priority Data

Oct. 16, 2023 (CN) .......................... 202311337579.6

(51) Int. Cl.
*G06F 15/16* (2006.01)
*G06F 16/2453* (2019.01)

(52) U.S. Cl.
CPC .. *G06F 16/24539* (2019.01); *G06F 16/24545* (2019.01)

(58) Field of Classification Search
None
See application file for complete search history.

(56) References Cited

U.S. PATENT DOCUMENTS

| | | | | |
|---|---|---|---|---|
| 10,095,621 | B1* | 10/2018 | Birke | G06F 12/0804 |
| 10,942,866 | B1* | 3/2021 | Holmes | G06F 16/24552 |
| 2017/0017576 | A1* | 1/2017 | Cammarota | G06F 12/0893 |
| 2021/0374523 | A1* | 12/2021 | Gottin | G06F 16/22 |
| 2024/0061751 | A1* | 2/2024 | Janarthanam | G06F 11/2097 |

OTHER PUBLICATIONS

Durner, Dominik et al.; Crystal: A Unified Cache Storage System for Analytical Databases; Proceedings of the VLDB Endowment; vol. 14, issue 11; 1 pages; dated Jul. 1, 2021.

* cited by examiner

*Primary Examiner* — Alex Gofman

(74) *Attorney, Agent, or Firm* — Faegre Drinker Biddle Reath LLP

(57) ABSTRACT

Provided is a method for processing an oracle region cache, an electronic device and a storage medium, relating to the field of data processing technology, and in particular to the fields of big data, cloud computing, distributed database, intelligent search and other technologies. The method includes: obtaining a benefit parameter of a region to be processed, wherein the benefit parameter is used to represent a difference between benefit and cost of setting the region to be processed in the oracle region cache; and selecting the region to be processed to update the oracle region cache when the benefit parameter of the region to be processed meets a target condition.

20 Claims, 5 Drawing Sheets

S101

Obtaining a benefit parameter of a region to be processed, where the benefit parameter is used to represent a difference between benefit and cost of setting the region to be processed in the oracle region cache

S102

Selecting the region to be processed to update the oracle region cache when the benefit parameter of the region to be processed meets a target condition

METHOD FOR PROCESSING ORACLE REGION CACHE ELECTRONIC DEVICE, AND STORAGE MEDIUM

CROSS-REFERENCE TO RELATED APPLICATIONS

The present application claims the priority from Chinese Patent Application No. 202311337579.6, filed with the Chinese Patent Office on Oct. 16, 2023, the content of which is hereby incorporated herein by reference in its entirety.

TECHNICAL FIELD

The present disclosure relates to the field of data processing technology, and in particular to the fields of big data, cloud computing, distributed database, intelligent search and other technologies.

BACKGROUND

When a user needs to query a database, the data in the cache is queried. When no result is found in the cache, the data stored in a hard disk is queried. However, in order to improve the query efficiency, the data in the cache needs to be updated in time.

SUMMARY

The present disclosure provides a method and apparatus for processing an oracle region cache, an electronic device and a storage medium.

According to an aspect of the present disclosure, provided is a method for processing an oracle region cache, including:

obtaining a benefit parameter of a region to be processed, where the benefit parameter is used to represent a difference between benefit and cost of setting the region to be processed in the oracle region cache; and selecting the region to be processed to update the oracle region cache when the benefit parameter of the region to be processed meets a target condition.

According to another aspect of the present disclosure, provided is an apparatus for processing an oracle region cache, including:

an obtaining module configured to obtain a benefit parameter of a region to be processed, where the benefit parameter is used to represent a difference between benefit and cost of setting the region to be processed in the oracle region cache; and an updating module configured to select the region to be processed to update the oracle region cache when the benefit parameter of the region to be processed meets a target condition.

According to yet another aspect of the present disclosure, provided is an electronic device, including:

at least one processor; and a memory connected in communication with the at least one processor;

where the memory stores an instruction executable by the at least one processor, and the instruction, when executed by the at least one processor, enables the at least one processor to execute the method of any embodiment of the present disclosure.

According to yet another aspect of the present disclosure, provided is a non-transitory computer-readable storage medium storing a computer instruction thereon, and the computer instruction is used to cause a computer to execute the method of any embodiment of the present disclosure.

According to yet another aspect of the present disclosure, provided is a computer program product including a computer program, and the computer program implements the method of any embodiment of the present disclosure, when executed by a processor.

The benefit parameter in the embodiment of the present disclosure takes into account the benefit and cost of storing the data of the region to be processed in the oracle region cache, and the value of setting the region to be processed in the oracle region cache can be accurately evaluated with a balanced consideration of benefit and cost, thereby improving the utilization rate of the cache.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

The accompanying drawings are used to better understand the present solution, and do not constitute a limitation to the present disclosure.

DETAILED DESCRIPTION

Hereinafter, descriptions to exemplary embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope of the present disclosure. Likewise, for clarity and conciseness, descriptions of well-known functions and structures are omitted in the following descriptions.

Moreover, the terms "first" and "second" are only for the purpose of description, and cannot be construed to indicate or imply the relative importance or implicitly point out the number of technical features indicated. Therefore, the feature defined with "first" or "second" may explicitly or implicitly include one or more features. In the description of the present disclosure, "a plurality of" means two or more than two, unless otherwise expressly and specifically defined.

In order to improve the user's query efficiency, the data in the cache needs to be updated in time. In the related art, when the data in the cache is updated, the LFU (Least Frequently Used), LRU (Least Recently Used) and other algorithms are generally used. The LFU is to update data through historical access frequency, which can be understood as eliminating data with low usage frequency in the recent period of time. The LRU is to update data through historical access records of data, which can be understood as eliminating data that has not been used in the recent period of time. Here, the cache may include OR Cache (Oracle Region Cache) and RR Cache (Requested Region Cache).

However, the above two updating methods cannot take full advantage of the cache, so a new method is needed to further improve the utilization rate of the cache.

Figure 1:
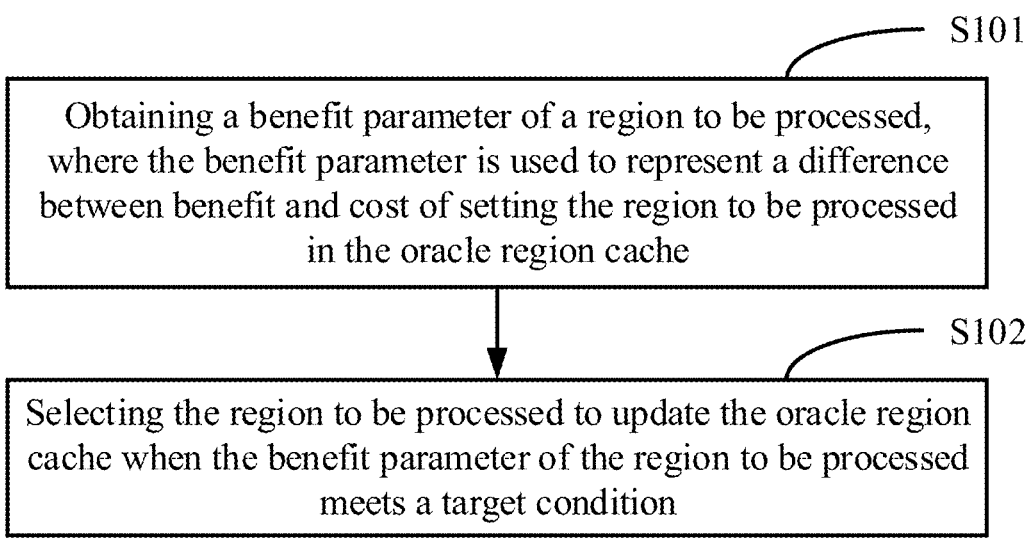
FIG. 1 is a schematic flowchart of a method for processing an oracle region cache according to an embodiment of the present disclosure.

An embodiment of the present disclosure proposes a method for processing an oracle region cache. The method is applicable to cache elimination of a distributed database, and is particularly applicable to a KV (Key-Value) storage engine. The method may be implemented as shown in FIG. 1, including:

S101: obtaining a benefit parameter of a region to be processed, where the benefit parameter is used to represent a difference between benefit and cost of setting the region to be processed in the oracle region cache.

Here, the region to be processed may come from the OR Cache or RR Cache, which is not limited in the present disclosure.

S102: selecting the region to be processed to update the oracle region cache when the benefit parameter of the region to be processed meets a target condition.

Due to the limited cache capacity, in order to save cache space, the region to be processed that meets the target condition may be placed in the oracle region cache for easy query by users.

In the embodiment of the present disclosure, the benefit parameter of the region to be processed is taken into consideration, and the oracle region cache is updated based on the region to be processed when the benefit parameter of the region to be processed meets the target condition. Compared with the simple method of eliminating the oracle region cache based on the access frequency and historical access record, the benefit parameter in the embodiment of the present disclosure takes into account the benefit and cost of storing the data of the region to be processed in the oracle region cache, and the value of setting the region to be processed in the oracle region cache can be accurately evaluated with a balanced consideration of benefit and cost, thereby improving the utilization rate of the cache.

In some embodiments, the step of obtaining the benefit parameter of the region to be processed may be implemented as follows:

Step A1: calculating the benefit of the region to be processed based on a first-type parameter of the region to be processed, where the first-type parameter reflects that the region to be processed is valuable to set in the oracle region cache.

Here, the first-type parameter may be at least one of: selectivity, reading frequency (freq), and data region size (size).

Since a data region includes a plurality of data, the selectivity may reflect the possibility that the data region is queried. In a possible implementation, the selectivity may be understood as the proportion of data queried in the data region within a first specified duration. For example, the total amount of data in the data region is M, the amount of data queried within the first specified duration is N, and then the selectivity is (N/M). In another possible implementation, the selectivity may be understood as a normalized value of the amount of data queried in the data region within a second specified duration. For example, the amount of data queried in the data region 1 is P, the amount of data queried in the data region 2 is Q, and then P and Q are normalized to obtain a normalized value of P representing the selectivity of the data region 1 and a normalized value of Q representing the selectivity of the data region 2.

The reading frequency may be understood as the number of times the data region is accessed within a preset duration.

When the selectivity, freq and size are used to calculate the benefit of the region to be processed, the expression for determining the benefit may be shown as formula (1):

$$\text{Benefit}(r) = \text{selectivity}(r) * \text{size}(r) * \text{freq}(r) \qquad (1)$$

Here, Benefit(r) is the benefit of the region r to be processed, selectivity(r) is the selectivity of the region r to be processed, size is the size of the data region of the region to be processed, freq(r) is the reading frequency of the region r to be processed, and r represents the identifier of the region to be processed.

It should be noted that at least one of them may also be selected to calculate the benefit of the region to be processed. The weight of each parameter in the first-type parameters may also be obtained, and the benefit of the region to be processed may be calculated using a weighted summation method, which is not limited in the embodiments of the present disclosure.

Step A2: calculating the cost of the region to be processed based on a second-type parameter of the region to be processed, where the second-type parameter reflects resource cost required for setting the region to be processed in the oracle region cache.

Here, the second-type parameters may be location data (locality), performance evaluation (disk io) and network evaluation (network) in the HDFS (Hadoop Distributed File System).

The locality is a number between 0 and 1, and the locality is the amount of data in the region to be processed that is stored in a local machine/the total amount of data in the region to be processed. The larger the locality, the more local data there is in the region to be processed, the less data needs to be read over the network, and the higher the performance.

The performance evaluation (disk io) is the transmission flow required to obtain the local data in the region to be processed.

The network evaluation (network) is the transmission flow required to obtain the data of the region to be processed from other devices.

When the locality, disk io and network are used to calculate the cost of the region to be processed, the expression for determining the cost may be shown as formula (2):

$$Cost(r) = \tag{2}$$

$$size(r) * locality(r) * disk\ io(r) + size(r) * (1 - locality(r)) * network(r)$$

Here, Cost(r) is the cost of the region r to be processed, size(r) has the same meaning as mentioned above, locality(r) represents the location data of the region r to be processed, disk io(r) represents the transmission flow required to obtain the local data in the region r to be processed, and network(r) represents the transmission flow required to obtain the data of the region r to be processed from other devices.

Step A3: determining the benefit parameter of the region to be processed based on the benefit of the region to be processed and the cost of the region to be processed.

Here, the benefit parameter (Ratio) of the region to be processed may be calculated based on a ratio of the benefit of the region to be processed to the cost of the region to be processed. The expression is shown as formula (3):

$$Ratio(r) = benefit(r)/cost(r) \tag{3}$$

Here, Ratio(r) is the benefit parameter of the region to be processed, and benefit(r) and cost(r) have the same meanings as mentioned above, and will not be described in detail in the embodiment of the present disclosure.

Here, the benefit parameter (Ratio) of the region to be processed may also be calculated based on a difference between the benefit of the region to be processed to the cost of the region to be processed. The expression is shown as formula (4):

$$Ratio(r) = benefit(r) - cost(r) \tag{4}$$

Here, Ratio(r), benefit(r) and cost(r) have the same meanings as mentioned above, and will not be described in detail in the embodiment of the present disclosure.

The benefit parameter of the region to be processed may also be calculated by using a ratio of the difference to the cost. The expression is shown as formula (5):

$$Ratio(r) = (benefit(r) - cost(r))/cost(r) \tag{5}$$

Here, Ratio(r), benefit(r) and cost(r) have the same meanings as mentioned above, and will not be described in detail in the embodiment of the present disclosure.

In the embodiments of the present disclosure, the benefit and cost of the region to be processed are calculated using the first-type parameter which can reflect that the region to be processed is valuable to set in the oracle region cache as well as the second-type parameter which can reflect the resource cost required for setting the region to be processed in the oracle region cache, thereby determining the benefit parameter of the region to be processed. The benefit parameter obtained by comprehensively measuring the comprehensive data situation can accurately represent the situation of the region to be processed, to lay the foundation for subsequent screening.

Figure 2:
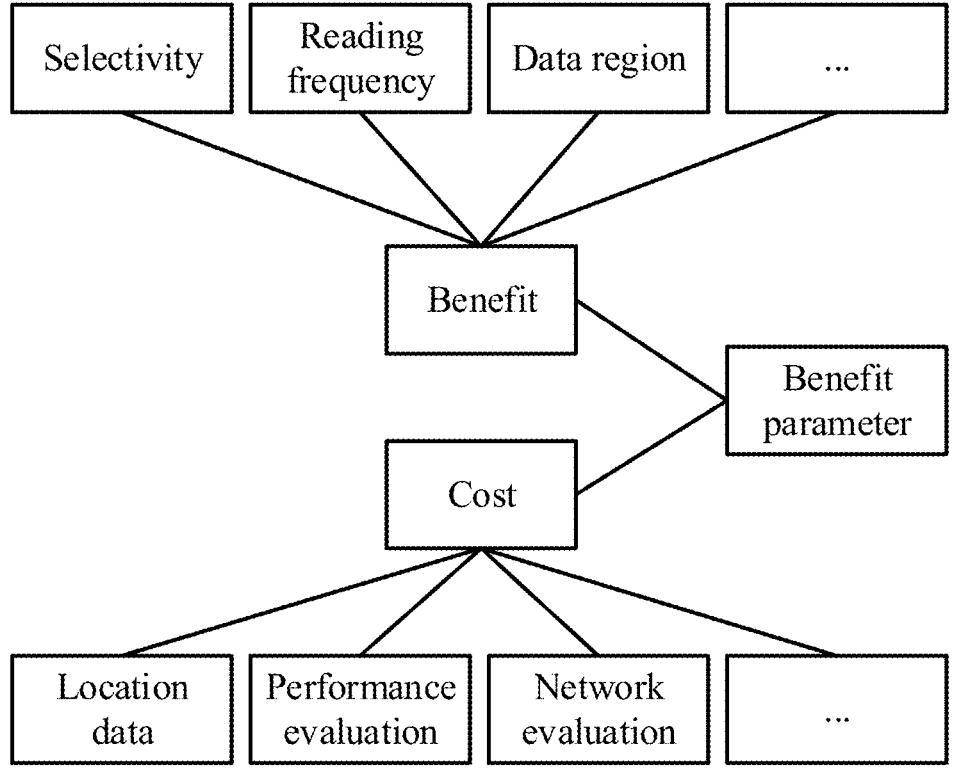
FIG. 2 is a schematic diagram of obtaining the benefit parameter according to an embodiment of the present disclosure.

In summary, as shown in FIG. 2, the benefit can be constructed based on the selectivity, the reading frequency and the data region size; the cost can be constructed based on the location data, the performance evaluation and the network evaluation; and the benefit parameter can be obtained based on the benefit and the cost.

In some embodiments, the target condition includes: the benefit parameter of the region to be processed is a maximum value in a set of regions to be screened.

The set of regions to be screened is {region 1 to be processed, region 2 to be processed, region 3 to be processed, . . . , region n to be processed}, the benefit parameter of the region 1 to be processed is a, the benefit parameter of the region 2 to be processed is b, the benefit parameter of the region 3 to be processed is c, and the benefit parameter of the region n to be processed is k. Here, the benefit parameters of the regions to be processed are compared. When b is the maximum value, the region 2 to be processed is used to update the oracle region cache.

In the embodiments of the present disclosure, the benefit parameter of the region to be processed is the maximum value in the set to be screened as the target condition. This method is simple to operate and easy to implement.

In some embodiments, the target condition may also include: the benefit parameter of the region to be processed ranks in the top m in the set of regions to be screened, and the data in these m regions to be processed do not overlap.

For example, the set of regions to be screened is {region 1 to be processed, region 2 to be processed, region 3 to be processed, . . . , region n to be processed}, the benefit parameter of the region 1 to be processed is a, the benefit parameter of the region 2 to be processed is b, the benefit parameter of the region 3 to be processed is c, and the benefit parameter of the region n to be processed is k. Here, the benefit parameters of the regions to be processed are compared to obtain the ranking of b>a>c> . . . >k, and then the overlap between the regions to be processed corresponding to the top m benefit parameters is determined. When the m regions to be processed do not overlap, it is determined that the m regions to be processed meet the target condition. When there is overlapping data among the m regions to be processed, the overlapping data among the regions to be processed with relatively low benefit parameters are eliminated. For example, the region 1 to be processed is {A and B and C}, and the region 2 to be processed is {B and C and D}. Then {B and C} in the region 2 to be processed can be eliminated to obtain the region 2 to be processed {D}, so as to obtain the region to be processed that meets the target condition.

In some embodiments, when a preset type is specified in the query statement, the target condition may also include: the benefit parameter of the region to be processed ranks in the top m in the set of regions to be screened, and belongs to the region to be processed in the preset type.

For example, the set of regions to be screened is still {region 1 to be processed, region 2 to be processed, region 3 to be processed, . . . , region n to be processed}, the benefit parameter of the region 1 to be processed is a, the benefit parameter of the region 2 to be processed is b, the benefit parameter of the region 3 to be processed is c, and the benefit parameter of the region n to be processed is k. Here, the benefit parameters of the regions to be processed are compared to obtain the ranking of b>a>c> . . . >k, and then the preset types corresponding to the top m benefit parameters are determined. The region to be processed that conforms to the preset type is used to update the oracle region cache.

In some embodiments, sources of data regions in the set of regions to be screened include the oracle region cache before updating and a requested region cache before updating; where priority is given to retrieval from the oracle region cache in case of retrieving data based on a target query statement.

In the embodiments of the present disclosure, since the data in these two caches are relatively commonly-used data, the data regions of the oracle region cache and the requested region cache are used as the data regions in the set of regions to be screened, so as to save computing resources and improve the work efficiency. At the same time, the key information can be retained in the oracle region cache, improving the utilization rate of the oracle region cache.

The source of a data region in the set of regions to be screened may also be any one of the oracle region cache before updating and the requested region cache before updating, which is not limited in the embodiments of the present disclosure.

In some embodiments, a scanning operation with filtering is performed based on a sorted string table, to obtain the region to be processed.

During implementation, in order to optimize the oracle region cache in a personalized manner for a query statement, the step of constructing the data region based on the query statement in the embodiment of the present disclosure may be implemented as follows: the scanning operation with filtering is performed on the sorted string table, and the obtained region to be processed contains a predicate, that is, the obtained data region includes a relationship with other data regions.

It can be understood that the definition of region is: a tuple list screened out by scan+filter (scanning operation with filtering) for a set of sstable (sorted string table). Any tuple list is called a region.

In order to facilitate region reuse, when the target query statement retrieves data, the data regions in the obtained query result may be retrieved in the form of Disjunctive Normal Form (DNF). The DNF is a standard form for describing logical expressions. For example, the region 1 to be processed is {A and B}, and the region 2 to be processed is {C and D}. When the query result is the region 1 to be processed and the region 2 to be processed, the query result is expressed in the form of (A and B) or (C and D). In popular terms, the form such as (A and B) or (C and D) is DNF pattern. The advantage of this pattern is that the region in the form such as (A and B) can be easily found and reused, and there is only a need to merge it with the region (C and D) and output them.

In the embodiment of the present disclosure, the data region constructed in this way can optimize the oracle region cache for the personalized query.

On the basis of determining the region to be processed based on the above method, considering that the relationship between data regions will affect the benefit, the benefit parameters of the unselected data regions need to be recalculated after each data region is selected, to further optimize the oracle region cache. The specific implementation is:

Step B1: eliminating the region to be processed from the set of regions to be screened, to update the set of regions to be screened.

Step B2: adjusting a benefit parameter of a region to be corrected based on a relationship between the region to be processed and the region to be corrected, where the region to be corrected is a data region in the updated set of regions to be screened.

For example, the set of regions to be screened is {data region 1, data region 2, data region 3, . . . , data region n}. After the data region 1 is determined as the region to be processed, the set of regions to be screened is updated to obtain an updated set of regions to be screened {data region 2, data region 3, . . . , data region n}, and any data region in this set is a region to be corrected.

In some embodiments, since there may be overlapping data between different data regions, the more overlapping data between an unselected region to be corrected and the selected region to be processed, the lower the value of keeping this unselected region to be corrected in the oracle region cache. Based on this, the step of adjusting the benefit parameter of the region to be corrected based on the relationship between the region to be processed and the region to be corrected may be implemented as follows: adjusting the benefit parameter of the region to be corrected based on the data overlap between the region to be processed and the region to be corrected; where the more overlapping data between the region to be processed and the region to be corrected, the more the benefit parameter will be reduced.

In the embodiments of the present disclosure, taking into account the possible overlapping data between different data regions, the more overlapping data between an unselected region to be corrected and the selected region to be processed, the lower the value of keeping this unselected region to be corrected in the oracle region cache. Therefore, the benefit parameter of the region to be corrected is adjusted to accurately represent the value of keeping the region to be corrected in the oracle region cache.

In some embodiments, the data overlap between the region to be processed and the region to be corrected is determined based on the following method:

Step C1: obtaining a first predicate set of the region to be processed and a second predicate set of the region to be corrected.

Step C2: determining the data overlap between the region to be processed and the region to be corrected based on a set relationship between the first predicate set and the second predicate set.

For example, the first predicate set of the region 1 to be processed is {B and C}, and the second predicate set of the region 1 to be corrected is {B and C and D}, that is, the data overlap between the region 1 to be processed and the region 1 to be corrected is partial overlap. The first predicate set of the region 2 to be processed is {D and E and F}, and the second predicate set of the region 2 to be corrected is {D and E}, that is, the data overlap between the region 2 to be processed and the region 2 to be corrected means that the region 2 to be corrected is a subset of the region 2 to be processed. The first predicate set of the region 3 to be processed is {A and B and C}, and the second predicate set of the region 2 to be corrected is {D and E}, that is, the data overlap between the region 1 to be processed and the region 2 to be corrected is no overlap.

In the embodiments of the present disclosure, the data overlap between the region to be processed and the region to be corrected is determined based on the set relationship between the first predicate set of the region to be processed and the second predicate set of the region to be corrected. This method is simple to operate and easy to implement. In addition, when the data region is constructed based on the query statement, the predicate also reflects the personalized feature of the query statement. Based on this, the oracle region cache can be further optimized for the personalized feature of the query statement.

The step of adjusting the benefit parameter of the region to be corrected based on the data overlap between the region to be processed and the region to be corrected may be implemented as follows:

Case 1: determining that the benefit parameter of the region to be corrected remains unchanged when there is no data overlap between the region to be processed and the region to be corrected.

When there is no data overlap between the region to be processed and the region to be corrected, that is, the data regions of the region to be processed and the region to be corrected are not related, so there is no need to consider the impact of the region to be processed on the region to be corrected, and thus the benefit parameter of the region to be corrected remains unchanged.

Figure 3A:
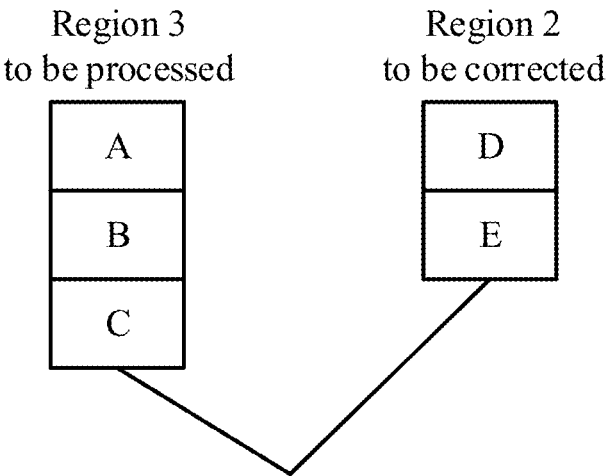
FIG. 3a is a schematic diagram of no data overlap according to an embodiment of the present disclosure.

For example, the region 3 to be processed is {A and B and C}, and the region 2 to be corrected is {D and E}. As shown in FIG. 3*a*, the data overlap between the region 3 to be processed and the region 2 to be corrected is no overlap. That is, the benefit parameter of the region 2 to be corrected remains unchanged.

In the embodiment of the present disclosure, considering no data overlap between the region to be processed and the region to be corrected, the benefit parameter of the region to be corrected remains unchanged, and the accurate benefit parameter that can describe the region to be corrected is obtained, laying a strong foundation for subsequent screening.

Case 2: adjusting the benefit parameter of the region to be corrected to a default lower limit value when the region to be corrected is a subset of the region to be processed.

Here, since the region to be corrected is a subset of the region to be processed, that is, the data of the region to be corrected has already been contained in the region to be processed, it can be understood that the data of the region to be corrected has already been stored in the cache. Then the region to be corrected may be set to the default lower limit value, and the default lower limit value may be 0.

Figure 3B:
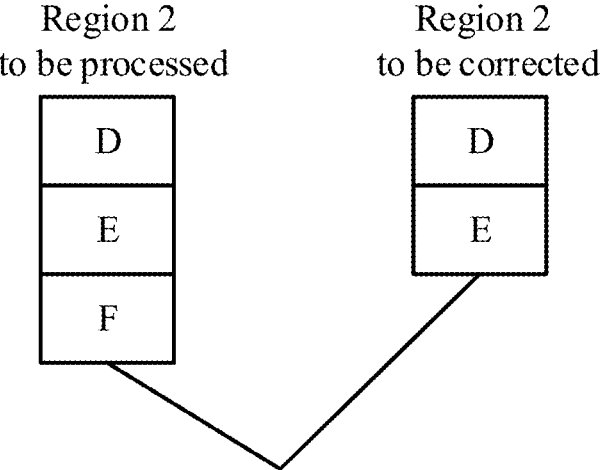
FIG. 3b is a schematic diagram of data overlap being a subset according to an embodiment of the present disclosure.

For example, the region 2 to be processed is {D and E and F}, and the region 2 to be corrected is {D and E}. As shown in FIG. 3*b*, the region 2 to be corrected is a subset of the region 2 to be processed, and the benefit parameter of the region 2 to be corrected is adjusted to 0.

In the embodiment of the present disclosure, when the region to be corrected is a subset of the region to be processed, the region to be corrected is set to the default lower limit value, indicating that the region to be corrected is not considered, laying a strong foundation for subsequent screening.

Case 3: when partial data overlaps between the region to be processed and the region to be corrected, determining a proportion of data in the region to be corrected that is not contained in the region to be processed; and adjusting the benefit parameter of the region to be corrected based on the proportion, where the adjusted benefit parameter has a positive correlation with the proportion.

During implementation, the benefit parameter of the region to be corrected may be adjusted based on expression (6):

$$\text{Ratio}(r)' = \text{Ratio}(r) * r(s) \tag{6}$$

Here, Ratio(r)' represents the benefit parameter of the region to be corrected after adjustment; Ratio(r) represents the benefit parameter of the region to be corrected before adjustment, and r(s) represents the proportion of the data in the region to be corrected that is not contained in the region to be processed.

Figure 3C:
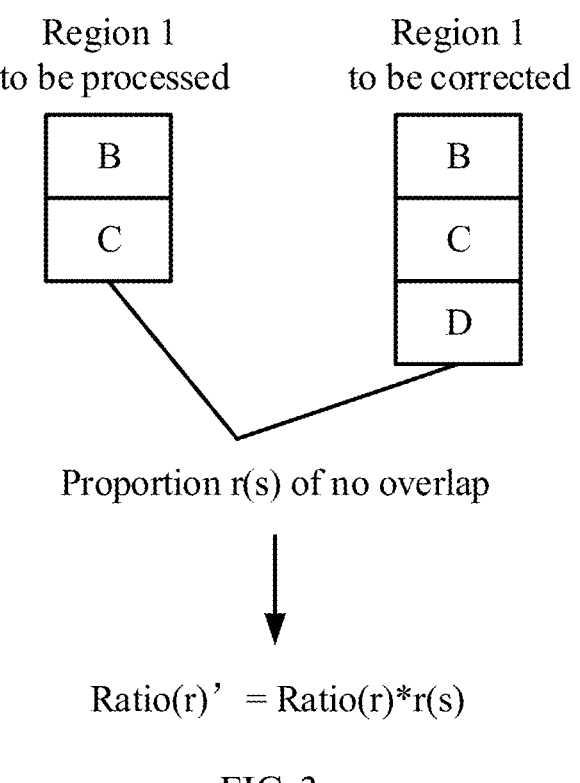
FIG. 3c is a schematic diagram of data overlap being partial overlap according to an embodiment of the present disclosure.

The region 1 to be processed is {B and C}, and the region 1 to be corrected is {B and C and D}, as shown in FIG. 3*c*, that is, the data overlap between the region 1 to be processed and the region 1 to be corrected is partial overlap. Based on the fact that the non-overlap ratio r(s) between the region 1 to be processed and the region 1 to be corrected is 33%, r(s) is multiplied by the original benefit parameter of the region 1 to be corrected, to obtain the adjusted benefit parameter of the region 1 to be corrected.

In the embodiment of the present disclosure, when the partial data overlaps between the region to be processed and the region to be corrected, that is, considering that the region to be corrected is not contained in the data region of the region to be processed, the benefit parameter of the region to be corrected is adjusted to lay a strong foundation for subsequent screening.

Step B3: selecting the region to be corrected to update the oracle region cache when the benefit parameter of the region to be corrected in the updated set of regions to be screened meets the target condition.

During implementation, when the benefit parameters of all the regions to be corrected in the set of regions to be screened are obtained, the regions to be corrected in the set of regions to be screened are screened based on the target condition, and the oracle region cache is updated using the region to be corrected that meets the target condition. The target condition is similar to that in the above description, and will not be described in detail in the embodiment of the present disclosure.

In the embodiment of the present disclosure, the relationship between the region to be processed and the region to be corrected is taken into consideration to adjust the benefit parameter of the region to be corrected. When the benefit parameter of the region to be corrected in the updated set of regions to be screened meets the target condition, the region to be corrected is determined to be a data region belonging to the oracle region cache. The data region of the oracle region cache obtained in this way can improve the utilization rate of the cache.

The OR Cache also needs to maintain a background elimination thread, to judge which regions in the OR Cache and RR Cache have higher benefit parameters, and then eliminate some regions with low benefit from the OR Cache and transfer some regions with high benefit from the RR Cache to the OR Cache.

Figure 4:
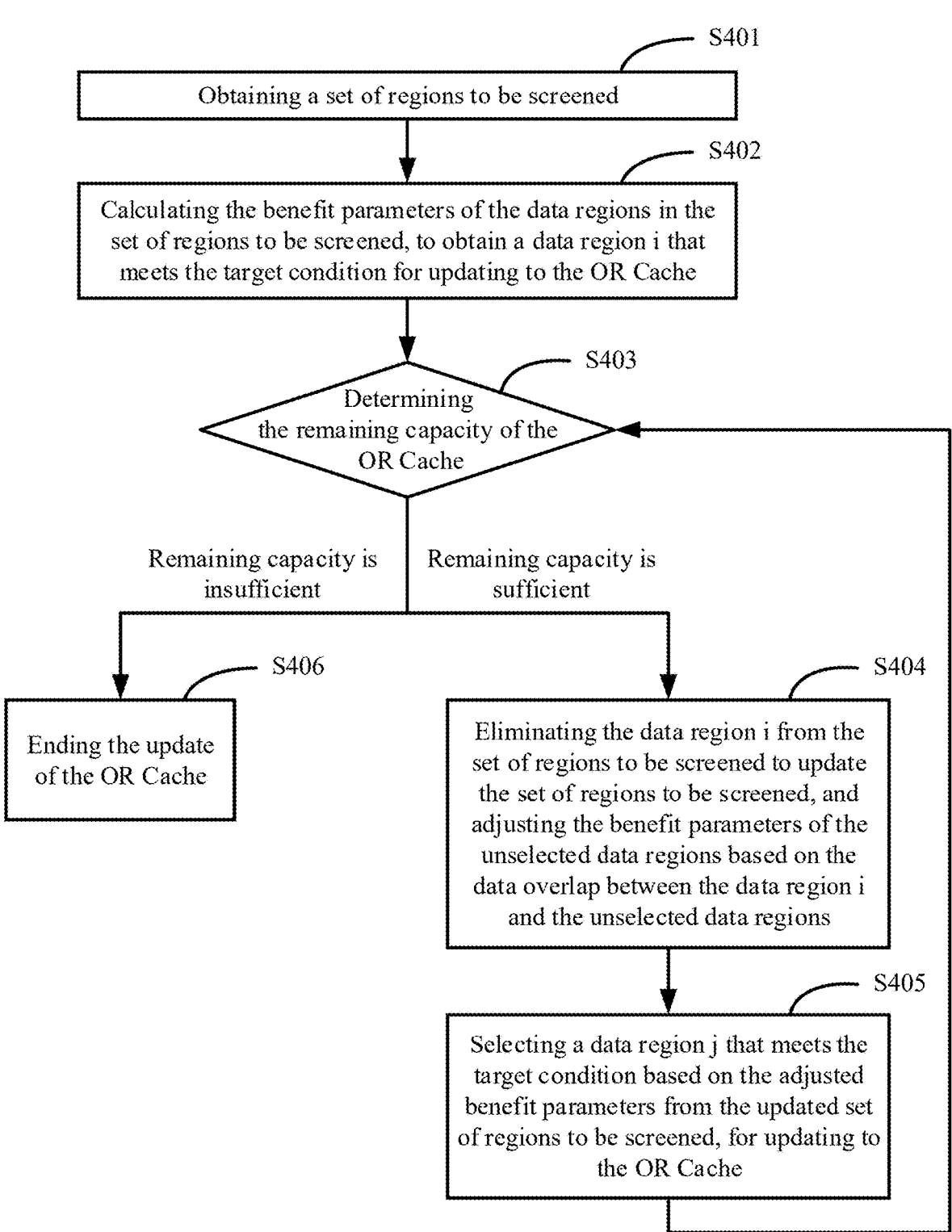
FIG. 4 is a schematic diagram of the overall flow of the method for processing the oracle region cache according to an embodiment of the present disclosure.
Figure 5:
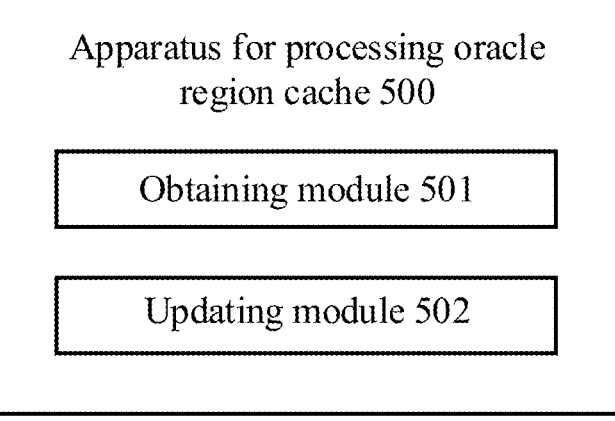
FIG. 5 is a structural schematic diagram of an apparatus for processing an oracle region cache according to an embodiment of the present disclosure.

For ease of understanding, an overall flowchart of the embodiment of the present disclosure is shown in FIG. 4, including:

S401: obtaining a set of regions to be screened; where the sources of data regions in the set of regions to be screened include the OR Cache before updating and the RR Cache before updating.

S402: calculating the benefit parameters of the data regions in the set of regions to be screened, to obtain a data region i that meets the target condition for updating to the OR Cache.

S403: determining the remaining capacity of the OR Cache. If the remaining capacity of the OR Cache is insufficient (e.g., less than a preset threshold), S406 is performed to end the update of the OR Cache; if the remaining capacity of the OR Cache is sufficient, S404 is performed. The preset threshold may be set based on actual conditions, and is not limited in the embodiment of the present disclosure.

S404: eliminating the data region i from the set of regions to be screened to update the set of regions to be screened, and adjusting the benefit parameters of the unselected data regions based on the data overlap between the data region i and the unselected data regions.

S405: selecting a data region j that meets the target condition based on the adjusted benefit parameters from the updated set of regions to be screened, for updating to the OR Cache; and returning to S403.

S406: ending the update of the OR Cache.

Based on the same technical concept, an embodiment of the present disclosure further provides an apparatus for processing an oracle region cache 500, including:

an obtaining module 501 configured to obtain a benefit parameter of a region to be processed, where the benefit parameter is used to represent a difference between benefit and cost of setting the region to be processed in the oracle region cache; and an updating module 502 configured to select the region to be processed to update the oracle region cache when the benefit parameter of the region to be processed meets a target condition.

In some embodiments, the target condition includes: the benefit parameter of the region to be processed is a maximum value in a set of regions to be screened.

In some embodiments, the apparatus further includes an adjustment module, including:

a first updating unit configured to eliminate the region to be processed from the set of regions to be screened, to update the set of regions to be screened;

an adjustment unit configured to adjust a benefit parameter of a region to be corrected based on a relationship between the region to be processed and the region to be corrected, where the region to be corrected is a data region in the updated set of regions to be screened; and a second updating unit configured to select the region to be corrected to update the oracle region cache when the benefit parameter of the region to be corrected in the updated set of regions to be screened meets the target condition.

In some embodiments, the adjustment unit is specifically configured to:

adjust the benefit parameter of the region to be corrected based on data overlap between the region to be processed and the region to be corrected;

where the more overlapping data there are between the region to be processed and the region to be corrected, the more the benefit parameter is reduced.

In some embodiments, the adjustment unit is specifically configured to:

determine that the benefit parameter of the region to be corrected remains unchanged when there is no data overlap between the region to be processed and the region to be corrected.

In some embodiments, the adjustment unit is specifically configured to:

adjust the benefit parameter of the region to be corrected to a default lower limit value when the region to be corrected is a subset of the region to be processed.

In some embodiments, the adjustment unit is specifically configured to:

determine a proportion of data in the region to be corrected that is not contained in the region to be processed when partial data overlaps between the region to be processed and the region to be corrected; and adjust the benefit parameter of the region to be corrected based on the proportion, where the adjusted benefit parameter has a positive correlation with the proportion.

In some embodiments, the apparatus further includes a determining module configured to:

obtain a first predicate set of the region to be processed and a second predicate set of the region to be corrected; and determine the data overlap between the region to be processed and the region to be corrected based on a set relationship between the first predicate set and the second predicate set.

In some embodiments, the obtaining module is specifically configured to:

calculate the benefit of the region to be processed based on a first-type parameter of the region to be processed, where the first-type parameter reflects that the region to be processed is valuable to set in the oracle region cache;

calculate the cost of the region to be processed based on a second-type parameter of the region to be processed, where the second-type parameter reflects resource cost required for setting the region to be processed in the oracle region cache; and determine the benefit parameter of the region to be processed based on the benefit of the region to be processed and the cost of the region to be processed.

In some embodiments, the apparatus further includes a constructing module configured to:

perform a scanning operation with filtering based on a sorted string table, to obtain the region to be processed.

In some embodiments, sources of data regions in the set of regions to be screened include the oracle region cache before updating and a requested region cache before updating;

where priority is given to retrieval from the oracle region cache in case of retrieving data based on a target query statement.

Of course, in the technical solution of the present disclosure, the acquisition, storage and application of the user's personal information involved are in compliance with relevant laws and regulations, and do not violate public order and good customs.

For the description of specific functions and examples of the modules and sub-modules of the apparatus of the embodiment of the present disclosure, reference may be made to the relevant description of the corresponding steps in the above-mentioned method embodiments, and details are not repeated here.

According to the embodiments of the present disclosure, the present disclosure also provides an electronic device, a readable storage medium and a computer program product.

Figure 6:
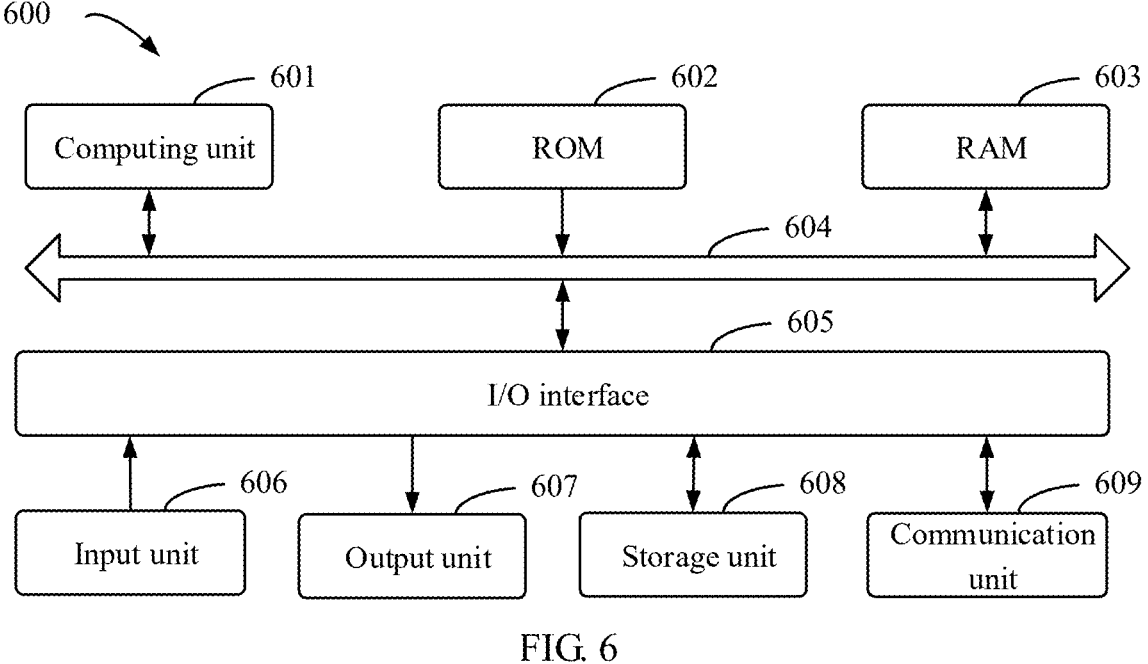
FIG. 6 is a block diagram of an electronic device used to implement the method for processing the oracle region cache according to an embodiment of the present disclosure.

FIG. 6 shows a schematic block diagram of an exemplary electronic device 600 that may be used to implement the embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital assistant, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 6, the device 600 includes a computing unit 601 that may perform various appropriate actions and processes according to a computer program stored in a Read-Only Memory (ROM) 602 or a computer program loaded from a storage unit 608 into a Random Access Memory (RAM) 603. Various programs and data required for an operation of device 600 may also be stored in the RAM 603. The computing unit 601, the ROM 602 and the RAM 603 are connected to each other through a bus 604. The input/output (I/O) interface 605 is also connected to the bus 604.

A plurality of components in the device 600 are connected to the I/O interface 605, and include an input unit 606 such as a keyboard, a mouse, or the like; an output unit 607 such as various types of displays, speakers, or the like; the storage unit 608 such as a magnetic disk, an optical disk, or the like; and a communication unit 609 such as a network card, a modem, a wireless communication transceiver, or the like. The communication unit 609 allows the device 600 to exchange information/data with other devices through a computer network such as the Internet and/or various tele-communication networks.

The computing unit 601 may be various general-purpose and/or special-purpose processing components with processing and computing capabilities. Some examples of the computing unit 601 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 601 performs various methods and processing described above, such as the method for processing the oracle region cache. For example, in some implementations, the method for processing the oracle region cache may be implemented as a computer software program tangibly contained in a computer-readable medium, such as the storage unit 608. In some implementations, a part or all of the computer program may be loaded and/or installed on the device 600 via the ROM 602 and/or the communication unit 609. When the computer program is loaded into the RAM 603 and executed by the computing unit 601, one or more steps of the method for processing the oracle region cache described above may be performed. Alternatively, in other implementations, the computing unit 601 may be configured to perform the method for processing the oracle region cache by any other suitable means (e.g., by means of firmware).

Various implementations of the system and technologies described above herein may be implemented in a digital electronic circuit system, an integrated circuit system, a Field Programmable Gate Array (FPGA), an Application Specific Integrated Circuit (ASIC), an Application Specific Standard Product (ASSP), a System on Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other program-mable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display apparatus (e.g., a cathode ray tube (CRT) or a Liquid Crystal Display (LCD) monitor) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware, or in a comput-ing system including a front-end component (e.g., a user computer with a graphical user interface or web browser through which the user may interact with the implementa-tion of the system and technologies described herein), or in a computing system including any combination of the back-end component, the middleware component, or the front-end component. The components of the system may be con-nected to each other through any form or kind of digital data communication (e.g., a communication network). Examples of the communication network include a Local Area Net-work (LAN), a Wide Area Network (WAN), and the Internet.

A computer system may include a client and a server. The client and server are generally far away from each other and usually interact with each other through a communication network. A relationship between the client and the server is generated by computer programs running on corresponding computers and having a client-server relationship with each other. The server may be a cloud server, a distributed system server, or a blockchain server.

It should be understood that, the steps may be reordered, added or removed by using the various forms of the flows described above. For example, the steps recorded in the present disclosure can be performed in parallel, in sequence, or in different orders, as long as a desired result of the technical scheme disclosed in the present disclosure can be realized, which is not limited herein.

The foregoing specific implementations do not constitute a limitation on the protection scope of the present disclosure. Those having ordinary skill in the art should understand that, various modifications, combinations, sub-combinations and substitutions may be made according to a design requirement and other factors. Any modification, equivalent replacement, improvement or the like made within the principle of the present disclosure shall be included in the protection scope of the present disclosure.

What is claimed is:

1. A method for processing an Oracle Region Cache (OR cache), applicable to cache elimination of a distributed database, comprising:

obtaining a benefit parameter of each region to be processed in a set of regions to be screened, comprising:

calculating a benefit of setting the region to be processed in the OR cache, based on a first-type parameter of the region to be processed; wherein the first-type parameter reflects that the region to be processed is valuable to set in the OR cache, and comprises at least one of selectivity, reading frequency, or data region size;

calculating a cost of setting the region to be processed in the OR cache, based on a second-type parameter of the region to be processed; wherein the second-type parameter reflects resource cost required for setting the region to be processed in the OR cache, and comprises location data, performance evaluation and network evaluation; wherein the location data is a number between 0 and 1, is a ratio of amount of data in the region to be processed that is stored in a local machine to total amount of data in the region to be processed, and is positively correlated with the amount of the data in the region to be processed that is stored in the local machine and negatively correlated with data that needs to be read over a network; the performance evaluation is a transmission flow required to obtain the data in the region to be processed that is stored in the local machine; and the network evaluation is transmission flow required to obtain data of the region to be processed from other devices; and determining the benefit parameter of the region to be processed, based on the benefit of setting the region to be processed in the OR cache and the cost of setting the region to be processed in the OR cache, wherein the benefit parameter is used to represent a difference between the benefit and cost of setting the region to be processed in the OR cache; and setting a target region to be processed in the OR cache, to update the OR cache, wherein a benefit parameter of the target region to be processed is a maximum value among benefit parameters of respective regions to be processed in the set of regions to be screened.

2. The method of claim 1, further comprising:

eliminating the region to be processed from the set of regions to be screened, to update the set of regions to be screened;

adjusting a benefit parameter of a region to be corrected based on a relationship between the region to be processed and the region to be corrected, wherein the region to be corrected is a data region in the updated set of regions to be screened; and selecting the region to be corrected to update the OR cache, in a case of the benefit parameter of the region to be corrected is a maximum value in the updated set of regions to be screened.

3. The method of claim 2, wherein the adjusting a benefit parameter of a region to be corrected based on a relationship between the region to be processed and the region to be corrected, comprises:

adjusting the benefit parameter of the region to be corrected based on data overlap between the region to be processed and the region to be corrected;

wherein the more overlapping data there are between the region to be processed and the region to be corrected, the more the benefit parameter is reduced.

4. The method of claim 3, wherein the adjusting the benefit parameter of the region to be corrected based on data overlap between the region to be processed and the region to be corrected, comprises:

determining that the benefit parameter of the region to be corrected remains unchanged when there is no data overlap between the region to be processed and the region to be corrected.

5. The method of claim 3, wherein the adjusting the benefit parameter of the region to be corrected based on data overlap between the region to be processed and the region to be corrected, comprises:

adjusting the benefit parameter of the region to be corrected to a default lower limit value when the region to be corrected is a subset of the region to be processed.

6. The method of claim 3, wherein the adjusting the benefit parameter of the region to be corrected based on data overlap between the region to be processed and the region to be corrected, comprises:

determining a proportion of data in the region to be corrected that is not contained in the region to be processed when partial data overlaps between the region to be processed and the region to be corrected; and adjusting the benefit parameter of the region to be corrected based on the proportion, wherein the adjusted benefit parameter has a positive correlation with the proportion.

7. The method of claim 3, further comprising: determining the data overlap between the region to be processed and the region to be corrected by:

obtaining a first predicate set of the region to be processed and a second predicate set of the region to be corrected; and determining the data overlap between the region to be processed and the region to be corrected based on a set relationship between the first predicate set and the second predicate set.

8. The method of claim 1, wherein sources of data regions in the set of regions to be screened comprise the OR cache before updating and a requested region cache before updating;

wherein priority is given to retrieval from the OR cache in case of retrieving data based on a target query statement.

9. An electronic device, comprising:

at least one processor; and a memory connected in communication with the at least one processor;

wherein the memory stores an instruction executable by the at least one processor, and the instruction, when executed by the at least one processor, enables the at least one processor to execute:

obtaining a benefit parameter of each region to be processed in a set of regions to be screened, by:

calculating a benefit of setting the region to be processed in the OR cache, based on a first-type parameter of the region to be processed, wherein the first-type parameter reflects that the region to be processed is valuable to set in the OR cache, and comprises at least one of selectivity, reading frequency, or data region size;

calculating a cost of setting the region to be processed in the OR cache, based on a second-type parameter of the region to be processed; wherein the second-type parameter reflects resource cost required for setting the region to be processed in the OR cache, and comprises location data, performance evaluation and network evaluation; wherein the location data is a number between 0 and 1, is a ratio of amount of data in the region to be processed that is stored in a local machine to total amount of data in the region to be processed, and is positively correlated with the amount of the data in the region to be processed that is stored in the local machine and negatively correlated with data that needs to be read over a network; the performance evaluation is a transmission flow required to obtain the data in the region to be processed that is stored in the local machine; and the network evaluation is transmission flow required to obtain data of the region to be processed from other devices; and determining the benefit parameter of the region to be processed, based on the benefit of setting the region to be processed in the OR cache and the cost of setting the region to be processed in the OR cache, wherein the benefit parameter is used to represent a difference between the benefit and cost of setting the region to be processed in the OR cache; and setting a target region to be processed in the OR cache, to update the OR cache, wherein a benefit parameter of the target region to be processed is a maximum value among benefit parameters of respective regions to be processed.

10. The electronic device of claim 9, wherein the instruction, when executed by the at least one processor, enables the at least one processor to further execute:

eliminating the region to be processed from the set of regions to be screened, to update the set of regions to be screened;

adjusting a benefit parameter of a region to be corrected based on a relationship between the region to be processed and the region to be corrected, wherein the region to be corrected is a data region in the updated set of regions to be screened; and selecting the region to be corrected to update the OR cache, in a case of the benefit parameter of the region to be corrected is a maximum value in the updated set of regions to be screened.

11. The electronic device of claim 10, wherein the adjusting a benefit parameter of a region to be corrected based on a relationship between the region to be processed and the region to be corrected, comprises:

adjusting the benefit parameter of the region to be corrected based on data overlap between the region to be processed and the region to be corrected;

wherein the more overlapping data there are between the region to be processed and the region to be corrected, the more the benefit parameter is reduced.

12. The electronic device of claim 11, wherein the adjusting the benefit parameter of the region to be corrected based on data overlap between the region to be processed and the region to be corrected, comprises:

determining that the benefit parameter of the region to be corrected remains unchanged when there is no data overlap between the region to be processed and the region to be corrected.

13. The electronic device of claim 11, wherein the adjusting the benefit parameter of the region to be corrected based on data overlap between the region to be processed and the region to be corrected, comprises:

adjusting the benefit parameter of the region to be corrected to a default lower limit value when the region to be corrected is a subset of the region to be processed.

14. The electronic device of claim 11, wherein the adjusting the benefit parameter of the region to be corrected based on data overlap between the region to be processed and the region to be corrected, comprises:

determining a proportion of data in the region to be corrected that is not contained in the region to be processed when partial data overlaps between the region to be processed and the region to be corrected; and adjusting the benefit parameter of the region to be corrected based on the proportion, wherein the adjusted benefit parameter has a positive correlation with the proportion.

15. A non-transitory computer-readable storage medium storing a computer instruction thereon, wherein the computer instruction is used to cause a computer to execute:

obtaining a benefit parameter of each region to be processed in a set of regions to be screened, by:

calculating a benefit of setting the region to be processed in the OR cache, based on a first-type parameter of the region to be processed; wherein the first-type parameter reflects that the region to be processed is valuable to set in the OR cache, and comprises at least one of selectivity, reading frequency, or data region size;

calculating a cost of setting the region to be processed in the OR cache, based on a second-type parameter of the region to be processed; wherein the second-type parameter reflects resource cost required for setting the region to be processed in the OR cache, and comprises location data, performance evaluation and network evaluation; wherein the location data is a number between 0 and 1, is a ratio of amount of data in the region to be processed that is stored in a local machine to total amount of data in the region to be processed, and is positively correlated with the amount of the data in the region to be processed that is stored in the local machine and negatively correlated with data that needs to be read over a network; the performance evaluation is a transmission flow required to obtain the data in the region to be processed that is stored in the local machine; and the network evaluation is transmission flow required to obtain data of the region to be processed from other devices; and determining the benefit parameter of the region to be processed, based on the benefit of setting the region to be processed in the OR cache and the cost of setting the region to be processed in the OR cache, wherein the benefit parameter is used to represent a difference between the benefit and cost of setting the region to be processed in the OR cache; and setting a target region to be processed in the OR cache, to update the OR cache, wherein a benefit parameter of the target region to be processed is a maximum value among benefit parameters of respective regions to be processed in the set of regions to be screened.

16. The non-transitory computer-readable storage medium of claim 15, wherein the computer instruction is used to cause the computer to further execute:

eliminating the region to be processed from the set of regions to be screened, to update the set of regions to be screened;

adjusting a benefit parameter of a region to be corrected based on a relationship between the region to be processed and the region to be corrected, wherein the region to be corrected is a data region in the updated set of regions to be screened; and selecting the region to be corrected to update the OR cache, in a case of the benefit parameter of the region to be corrected is a maximum value in the updated set of regions to be screened.

17. The non-transitory computer-readable storage medium of claim 16, wherein the adjusting a benefit parameter of a region to be corrected based on a relationship between the region to be processed and the region to be corrected, comprises:

adjusting the benefit parameter of the region to be corrected based on data overlap between the region to be processed and the region to be corrected;

wherein the more overlapping data there are between the region to be processed and the region to be corrected, the more the benefit parameter is reduced.

18. The non-transitory computer-readable storage medium of claim 17, wherein the adjusting the benefit parameter of the region to be corrected based on data overlap between the region to be processed and the region to be corrected, comprises:

determining that the benefit parameter of the region to be corrected remains unchanged when there is no data overlap between the region to be processed and the region to be corrected.

19. The non-transitory computer-readable storage medium of claim 17, wherein the adjusting the benefit parameter of the region to be corrected based on data overlap between the region to be processed and the region to be corrected, comprises:

adjusting the benefit parameter of the region to be corrected to a default lower limit value when the region to be corrected is a subset of the region to be processed.

20. The non-transitory computer-readable storage medium of claim 17, wherein the adjusting the benefit parameter of the region to be corrected based on data overlap between the region to be processed and the region to be corrected, comprises:

determining a proportion of data in the region to be corrected that is not contained in the region to be processed when partial data overlaps between the region to be processed and the region to be corrected; and adjusting the benefit parameter of the region to be corrected based on the proportion, wherein the adjusted benefit parameter has a positive correlation with the proportion.

* * * * *